(12) United States Patent
Duerr et al.

(10) Patent No.: US 7,251,984 B2
(45) Date of Patent: Aug. 7, 2007

(54) REFRIGERANT WITH LEAK DETECTION DYE CONCENTRATE

(75) Inventors: John Duerr, Massapequa Park, NY (US); B. William Cooper, Lloyd Harbor, NY (US)

(73) Assignee: Spectronics Corporation, Westbury, NY (US)

( * ) Notice: Subject to any disclaimer, the term of this patent is extended or adjusted under 35 U.S.C. 154(b) by 0 days.

(21) Appl. No.: 11/238,346

(22) Filed: Sep. 29, 2005

(65) Prior Publication Data

US 2006/0049329 A1 Mar. 9, 2006

Related U.S. Application Data

(63) Continuation-in-part of application No. PCT/US04/014136, filed on May 5, 2004.

(51) Int. Cl.
*G01M 3/20* (2006.01)
*B65B 3/00* (2006.01)

(52) U.S. Cl. .................. 73/40.7; 220/86.1; 252/964

(58) Field of Classification Search ................ 73/40.7; 252/68, 964; 220/86.1
See application file for complete search history.

(56) References Cited

U.S. PATENT DOCUMENTS

| | | | |
|---|---|---|---|
| 4,938,063 A | 7/1990 | Leighley | |
| 5,149,453 A | 9/1992 | Parekh | |
| 5,167,140 A | 12/1992 | Cooper et al. | |
| 6,101,867 A * | 8/2000 | Cavestri | 73/40.7 |
| RE36,951 E | 11/2000 | Cooper et al. | 73/40.7 |
| 6,165,384 A | 12/2000 | Cooper et al. | |
| 6,183,663 B1 * | 2/2001 | Kalley et al. | 252/68 |
| 2004/0084095 A1 * | 5/2004 | Knowles | 137/614 |

OTHER PUBLICATIONS

PCT/2004/014136.

\* cited by examiner

*Primary Examiner*—Daniel S. Larkin
(74) *Attorney, Agent, or Firm*—Drinker Biddle & Reath LLP

(57) ABSTRACT

A container including a mixture of refrigerant and leak detection dye medium is disclosed for adding to an air conditioning or refrigeration system. The container includes a storage container adapted to communicate with an air conditioning or refrigeration system for supplying material inside the container to the air conditioning or refrigeration system. A refrigerant is contained within the container, along with a leak detection dye medium. The dye medium including a dye adapted to fluoresce when exposed to incident radiation below about 500 nm. The dye medium having an initial state where at least a portion of the dye medium is in a non-liquid form separate from the refrigerant and includes a concentrated dye, and a second state where the dye is dispersed or mixed with the refrigerant. A method of forming the mixture within the container is also disclosed.

22 Claims, 5 Drawing Sheets

REFRIGERANT WITH LEAK DETECTION DYE CONCENTRATE

RELATED APPLICATION

This application is a continuation-in-part of pending PCT application PCT/US2004/014136 filed May 5, 2004, which designates the United States, and which is incorporated herein by reference in its entirety.

FIELD OF THE INVENTION

This invention relates generally to the field of leak detection in an air conditioning or other refrigeration system and, more particularly, to a prepackaged refrigerant and leak detection dye concentrate.

BACKGROUND OF THE INVENTION

There has long been a need to locate leaks in closed refrigeration systems, originally because the loss of refrigerant reduced the cooling capacity of the system, and increasingly because the refrigerants themselves are potential hazardous or deleterious substances when released to the atmosphere. In particular, the production and use of chlorofluorocarbon (CFC) and hydrochlorofluorocarbon (HCFC) refrigerants is scheduled for incremental phaseout, and for recovery and recycling in the interim.

Various methods have been used for detecting and locating leaks in a refrigeration system. Since a slow leak of refrigerant is essentially silent and invisible, such methods have included halide torches, electronic sensors, coating exterior joints with material which reacts with the refrigerant, and injecting various types of dye into the refrigeration equipment to locate sites where the dye exits the system.

One of the most effective methods for detecting leaks in refrigeration systems comprises introducing into the refrigeration system an effective amount of a fluorescent dye compound. The dye compound circulates with the refrigerant and oil throughout the refrigeration circuit, and is carried out with escaping refrigerant and oil at a leak site. When the refrigeration system is exposed to ultraviolet light, even a small deposit of the dye compound will fluoresce brightly, thereby permitting visual detection of the leak. U.S. Pat. No. 5,149,453 discloses such a method for detecting leaks in a refrigeration system, and its content is incorporated herein by reference.

When practicing the above method of leak detection with a fluorescent dye, care has to be taken that the fluorescent dye additive is not allowed to contact the exterior of the refrigeration system as the dye is being introduced into the system. If dye additive is inadvertently spilled or rubbed on the exterior of the system, it will be difficult to distinguish between fluorescence from a leak site and that resulting from inadvertent external contact. This is a particular concern where the dye additive is used for quality assurance checks of air conditioners on newly assembled automobiles, as the air conditioning system's final assembly is usually completed in the automobile assembly line, after which the system is charged with refrigerant and leak detection additive, then operated to circulate the additive and reveal any leaks when viewed under ultraviolet light. While care is normally taken to prevent the refrigerant, lubricant and dye from escaping, the nature of the assembly and charging process creates a risk of spills or inadvertent contamination on clothing or tools. Since very low concentration of dye is required to produce fluorescence, any dye, dyed refrigerant or oil spilled or rubbed on the exterior of the air conditioning system may cause false leak indications.

It is known, as disclosed in U.S. Pat. No. Re. 36,951, to place a leak detection dye into a closed air conditioning or refrigeration system prior to the initial charging the system with refrigerant. This desirably limits the possibility of inadvertent contact between the dye and the exterior of the air conditioner system or personnel responsible for installing and charging the air conditioning system. U.S. Pat. No. Re. 36,951 describes a process where an absorbent wafer, or other suitable substrate carrier, is saturated with a mixture of a dye and a solvent, such as a refrigerant system lubricating oil. This system of placing dye on the substrate carrier is sometimes known as a "wet" system because the dye remains in a liquid state.

It is also known to place a leak detection dye onto a wafer by saturating the wafer with a mixture of dye powder and alcohol. Following evaporation of the alcohol, the dye remains in the form of dye solids dispersed through the wafer. This system of placing dye onto a carrier wafer is sometimes referred to as a "dry" system because of the evaporation of the alcohol from the saturating mixture that contains the dye component.

The dye carrying wafer, or other substrate, is placed into the air conditioning system and remains in the system indefinitely. Therefore, following the initial delivery of leak detection dye from the wafer to the system, the presence of the wafer in the closed system will no longer serve a useful purpose.

Prepackaged canisters of refrigerant mixed with dye are currently available. These canisters are generally made for after-market use by auto repair personnel and to introduce into the air conditioning system in order to detect leakage in an air conditioning system that is losing refrigerant. These existing canisters are manufactured in predetermined sizes, such as 12 ounce cans, 30 pound cylinders, etc., and include a mixture of dye and refrigerant. In these canisters, the dye is introduced in a liquid form. However, as discussed above, use of liquid dyes can be quite messy. Any spillage of the dyes onto the canister can lead to false indications. Further, the process of adding liquid dye to the refrigerant cans as they are being manufactured can be difficult.

Large tanks or reservoirs are used to store the liquid refrigerant that is to be filled into the smaller cans or cylinders. These can be pre-treated with liquid dye but they would then have to either be dedicated to the filling of dyed refrigerant product or thoroughly cleaned and reconditioned between uses. Cleaning the tanks thoroughly is difficult and depending on their design may be impossible. Dedicating large refrigerant holding tanks to a dyed refrigerant product line is very expensive and presents logistical problems. If the smaller cylinders or cans are pre-filled with liquid dye than there is still a problem with the incoming refrigerant causing small amounts of dye to be sprayed onto the cans or filling equipment. As more cans are filled this dye will accumulate and necessitate the filling system to be stopped for cleaning or the dyed refrigerant products will be contaminated.

A need therefore exists for an alternate delivery system for introducing dyed refrigerant into a refrigeration system without the need of using a free-flowing liquid dye.

SUMMARY OF THE INVENTION

The present invention provides a prepackaged refrigerant and leak detection dye system for use in adding a refrigerant and dye mixture to a closed air-conditioning or refrigeration system.

In one embodiment, the invention is directed to a container including the mixture of refrigerant and leak detection dye medium. The container is adapted to communicate with a hose or similar connection or adapter for supplying the mixture which is inside the container to the air conditioning or refrigeration system. A refrigerant is contained within the container, along with a leak detection dye medium. The dye medium includes a dye adapted to fluoresce when exposed to incident radiation below about 500 nm. The dye has an initial state where at least a portion of the dye is in a non-liquid concentrated form separate from the refrigerant, and a second state where the dye is dispersed or mixed with the refrigerant after the container is filled.

In one embodiment, the dye medium is a pill, tablet or powder which contains primarily the concentrated dye. The pill, tablet, or powder is designed to dissolve, melt or otherwise intermix into the refrigerant after it is added to the container.

In another embodiment, the dye medium is a wafer that is impregnated with a crystallized or similarly dry dye concentrate designed to dissolve, melt or otherwise intermix into the refrigerant after it is added to the container. In a further embodiments, the dye medium is a wafer that is treated with a liquid dye, or a hybrid wafer (a dry dye wafer impregnated with a little liquid oil or additional dye to soften the dye.

A method of forming the mixture within the container is also disclosed.

Other objects, aspects and advantages of the present invention will become apparent to those skilled in the art upon reading the following detailed description, when considered in conjunction with the appended claims and the accompanying drawings briefly described below.

BRIEF DESCRIPTION OF THE DRAWINGS

For the purpose of illustrating the invention, the drawings show a form of the invention which is presently preferred; it being understood, however, that the invention is not limited to the precise arrangement and instrumentality shown.

DESCRIPTION OF THE PREFERRED EMBODIMENTS

Figure 1:
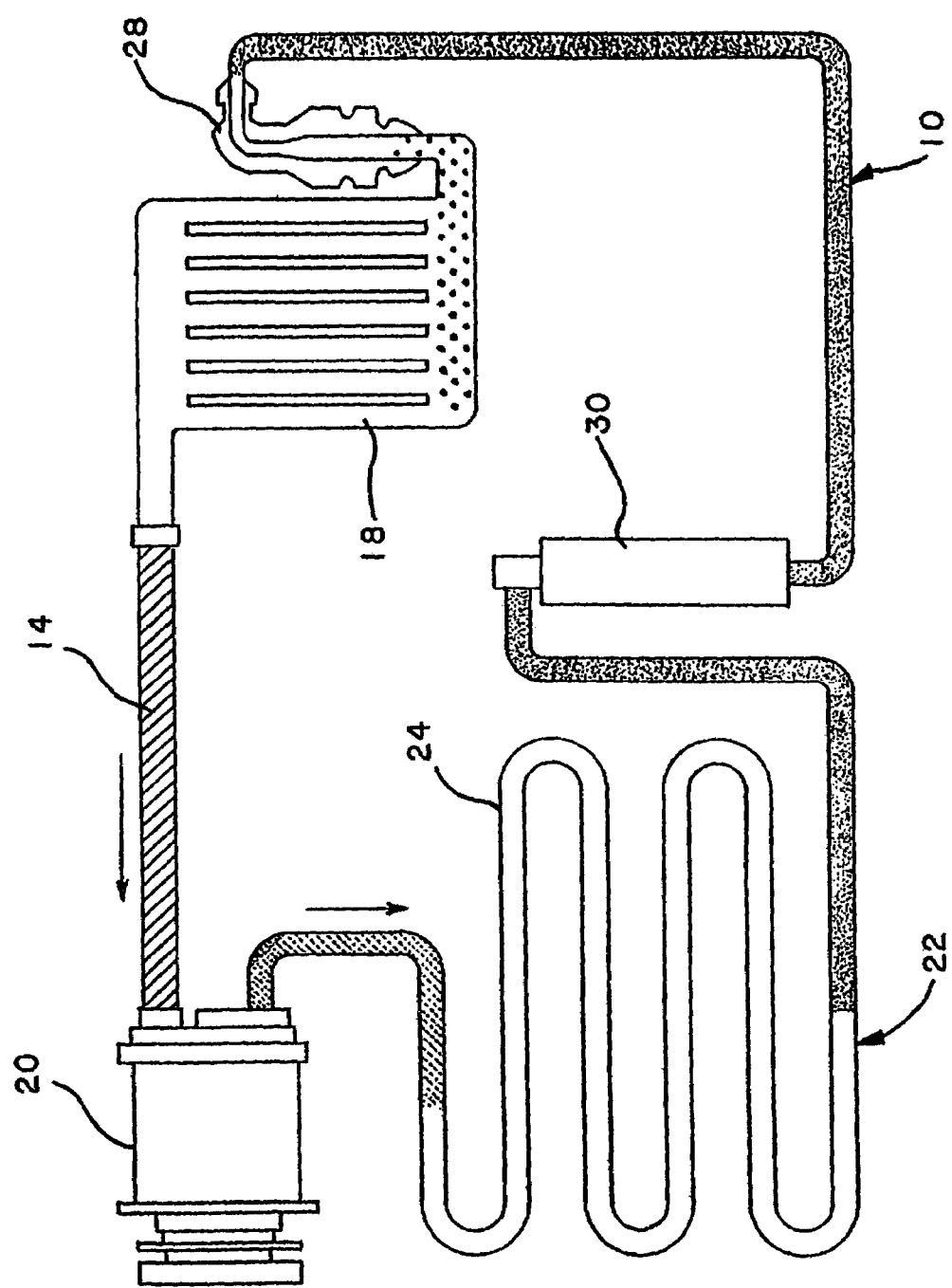
FIG. 1 is a schematic illustration of a basic refrigeration system of an automobile air conditioner, using a receiver-dehydrator between the condenser and evaporator.
Figure 2:
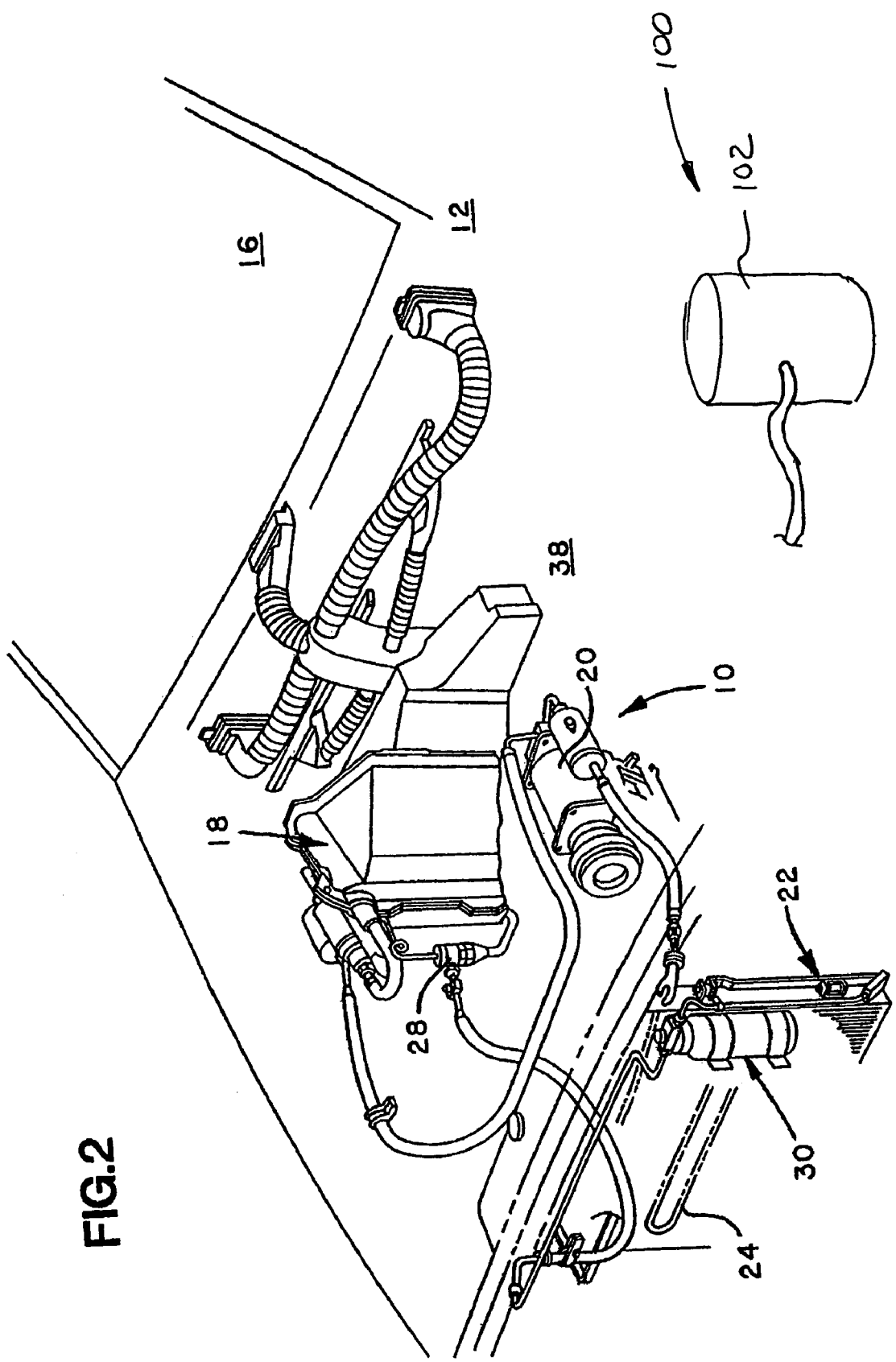
FIG. 2 is a perspective view of an automobile air conditioner system showing the major components as installed in an automobile.

Referring to the drawings in detail, wherein like numerals indicate like elements, FIG. 1 illustrates a basic closed refrigeration circuit 10 of an automobile air conditioner, by which air inside the automobile is cooled and dehumidified. FIG. 2 provides greater detail of the system 10 as it is arranged in an automobile 12.

A refrigerant 14, such as R-12 or more recently R-134a, circulates under pressure in the air conditioning/refrigeration system. In each cycle, the refrigerant is caused to change phase from liquid to gas and back to liquid, absorbing heat from the passenger compartment 16 and releasing heat outside the compartment.

More specifically, the air conditioning system 10 has an evaporator unit 18 where subcooled liquid refrigerant enters and is allowed to expand and absorb heat from warm air of the passenger compartment, causing the refrigerant to vaporize. The warm air of the passenger compartment 16 is connected to the evaporator 18 via ducting, as seen in FIG. 2, such that the cooled and dried air is recirculated into the passenger compartment. After absorbing heat from the passenger compartment, the refrigerant gas is drawn from the evaporator by suction into a compressor 20, which compresses the gas, thereby raising its pressure and temperature. The high-pressure hot vapor is passed through a condenser 22, in which the vapor is exposed to a large cooling-surface area by flowing through a labyrinth of finned-coils 24 over which outside air is rapidly blown to transport heat away from the vapor. The refrigerant 14 cools to the condensation temperature, releasing its heat as condensation, and changing phase back to a hot liquid, still at a high pressure. The refrigerant 14 completes the cycle by passing through a thermostatic expansion valve 28, which meters the high pressure liquid refrigerant 14 as a low pressure spray into the evaporator 18.

In some systems it is necessary to reservoir the liquid refrigerant before it is metered through the expansion valve because the demand of the evaporator varies under differing conditions. In other systems it is a practice to install an accumulator between the evaporator and compressor so that no liquid can enter the compressor. In either system, water contamination in the refrigerant can cause the water vapor to freeze at the point of expansion, causing refrigerant flow to be blocked, and to react with refrigerants to form acids that may cause internal damage to metal parts. Consequently, in the depicted embodiment, a receiver-dehydrator, also referred to as receiver-drier, 30 is located between the condenser 22 and the evaporator 18 to reservoir the refrigerant and remove moisture from it. In other air conditioner systems, an accumulator-dehydrator may be located between the evaporator and compressor to accumulate the refrigerant vapor and remove moisture from it.

As shown in FIG. 2, the air conditioning system components are located in different parts of the engine compartment 38 and attached to various other components of the automobile. Thus, final assembly of the air conditioner usually occurs at the time of its installation into the automobile, and the system cannot be charged with refrigerant until this point. When the air conditioner is assembled and installed in the automobile, the system is evacuated to remove air and moisture prior to charging with refrigerant. The system is charged with a refrigerant charging system 100 which introduces refrigerant under pressure from a storage container 102 into the system through the system service valves 104 (either high pressure or low pressure side valves).

Figure 3:
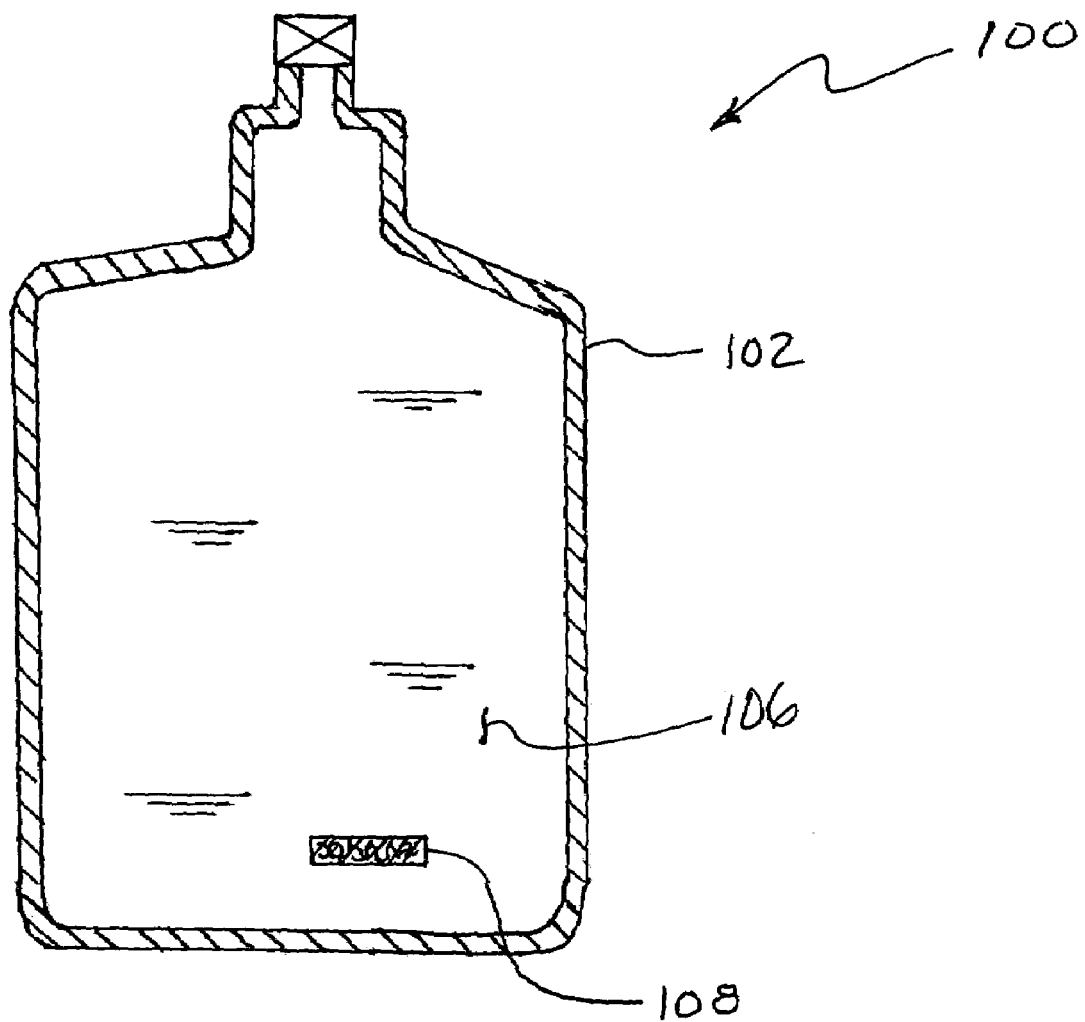
FIG. 3 is a schematic cross-section of a container that includes a refrigerant and with a dye medium located within the vessel in its initial state.

According to one embodiment of the present invention, depicted in FIG. 3, the storage container 102, in addition to containing the pressurized refrigerant 106, also contains a concentrated dye medium 108. The dye medium 108 can be any form of concentrated dye delivery mechanism, including a concentrated pill, tablet or a dye-laden or charged carrier, such as a wafer, a powder, or a semi solid, such as a gel. If formed as a pill or a tablet, the dye may or may not include a binding agent or other secondary, non-dye composition.

If formed as a wafer, the dye carrier wafer is made from any suitable substrate material that is absorbent to liquid but does not react with the refrigerant or system lubricant that is contained within the canister. The wafer is preferably of a matrix construction to maximize storage of dye concentrate. U.S. Pat. No. Re. 36,951, which is incorporated herein by reference in its entirety, describes one method of forming a wafer that is suitable for use in the present invention. International application PCT/2004/014136 describes an alternate method of forming a suitable charged wafer.

As described in U.S. Pat. No. Re. 36,951, one preferred wafer for use in the present invention is made from a melamine treated 100% polyester felt mat cut into circular disks or wafers such that there are no or minimal loose fibers or felt residue from the cutting procedure. Reissue '951 describes that the wafer preferably has a circular shape ¾ of an inch in diameter and a thickness of 0.315 inches. While that size can be used in the present invention, it should be noted that any suitable size wafer can be used which includes the appropriate amount of dye concentrate for mixing with the refrigerant. As described in International application PCT/2004/014136, a smaller wafer size can be employed if the high concentrate double-dipped process described in that PCT application is used.

Other substrate materials, such as natural or synthetic sponge, sintered brass or other metals may be substituted for those described above. The substrate may have various shapes, and quantities and dimensions may be varied as desired for specific applications.

The dye medium 108 is included in the canister or storage reservoir 102 and designed to breakdown, dissolve or disperse the concentrated dye into the refrigerant, either during filling or storage, or as the refrigerant is added to the air conditioning or refrigeration system.

Any suitable conventional tablet or pill forming method can be used to form the dye concentrate into a tablet or pill shape. A suitable binder can be used to maintain the dye concentrate in the formed shape. The binder can designed to breakdown when exposed to the refrigerant or the lubricant contained within the refrigerant. The binder, if used, is preferably selected so as not to adversely affect the operation of the components of the air conditioning or refrigeration system. Those skilled in the art would be readily capable of manufacturing a pill or tablet in accordance with the teachings of the present invention.

The specific amount of leak detection dye that needs to be carried by the carrier wafer or contained in the pill or tablet will depend on the volume of refrigerant and lubricant contained within the container 102 so as to produce a mixture which will make leaks in the system visible, and the amount of dye that the air conditioning or refrigeration system can accommodate without adversely effecting its operation. The exact amount of dye used varies with the strength of the dye, the amount of lubricant in the targeted system and the desired fluorescent response. For example, in one embodiment, a concentration of liquid dye is contained in the dye medium that is sufficient to treat 8 ounces of oil to a 375:1 dilution ratio. In this case 0.021 oz liquid dye would be used. A similar embodiment would use 0.12 g of a solid dye. If the dyed refrigerant cans were to be used in a service situation where the can must be designed to treat many different systems that have different oil charges, alternate approaches might be used. In current automotive service applications the vehicles' oil charges can range from 3 oz to 15 oz. The dye added to the refrigerant container in this case must be sufficient to treat each case. In these cans a 0.04 oz liquid dye charge could be used to treat every vehicle to a minimum of a 375:1 dilution ratio. A similar embodiment would use 0.24 g of a solid dye.

The container 102 is formed by adding/inserting the concentrate dye medium 108 into the container 102. The refrigerant 106 may be added before or after the concentrate dye medium is added. Once the two constituent parts are mixed into the container 102, the concentrate dye medium will begin to dissolve, melt or otherwise intermix with the refrigerant to form a dyed refrigerant.

Figure 4:
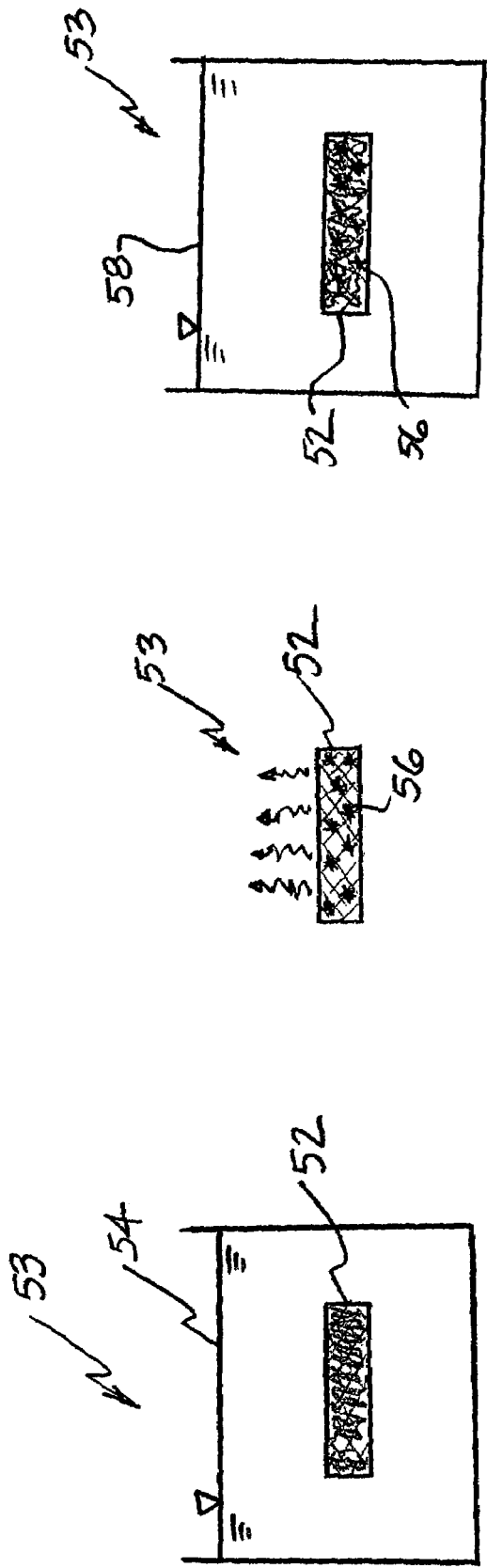
FIGS. 4A through 4C schematically illustrate a method of forming a leak detection dye carrier according to the invention.

Referring to FIGS. 4A through 4C, a method 53 of forming a version of the dye carrier wafer 52 for use as the dye medium according to one embodiment of the present invention is shown schematically. The method 53 utilizes a two-stage process for placing a dye onto the wafer 52, or other suitable substrate carrier, for subsequent introduction into the container 102. The method is described in detail in International application PCT/2004/014136.

In a first stage of the two-stage process 53, the wafer 52 is wetted or saturated with a mixture 54 comprising a dye powder and an evaporable carrier liquid or solvent, such as an alcohol, acetone, a high boiling point refrigerant or even water. Preferably, the mixture 54 is a dye/alcohol mixture which is applied to the wafer 52 by immersing the wafer into a quantity of the dye/alcohol mixture. Immersion of the wafer 52 is not required, however, and other means could be used to apply the mixture 54 to the wafer 52 resulting in absorption by the wafer of a suitable amount of the dye/ evaporable solvent mixture. Preferably, the wafer is saturated with the mixture.

Referring to FIG. 4B, the wet wafer 52 is then exposed to an environment, and for a sufficient amount of time, to permit the evaporable solvent from the mixture 54 to evaporate. As a result of the evaporation of the solvent, the dye component of the applied mixture 54 remains on the substrate wafer 52 in the form of dye solids 56 dispersed throughout the wafer 52.

Referring to FIG. 4C, the second stage of the method 53 of forming the dye carrier wafer 52 is shown schematically. In the second stage of method 53, a second liquid 58 is applied to the wafer 52 and dispersed dye solids 56. Preferably, the second liquid is applied by immersing the product in a wet bath containing the second liquid 58. In one embodiment, the second liquid is a mixture of a dye and a solvent.

Thus, the first and second stages of method 53 is a hybrid process of dry and wet systems, respectively, for applying dye to a substrate carrier. For embodiments where the liquid applied in the second stage includes a dye, the concentration of the dye in the wet bath of the second stage of method 53 can be adjusted to control the total amount of dye to be carried by the wafer 52 following the hybrid dry/wet process. For example, assume that the first dry stage of method 53 results in 0.14 grams of dye solids being dispersed throughout the wafer 52. Assume further that the wafer 52 can absorb an additional 0.16 grams of liquid in the second wet stage of method 53. For the wafer 52 to carry a total of 0.20 grams of dye following the hybrid dry/wet process, then the wet bath utilized in the second stage of method 53 should contain a mixture including sixty percent system liquid solvent and forty percent dye.

Figure 5:
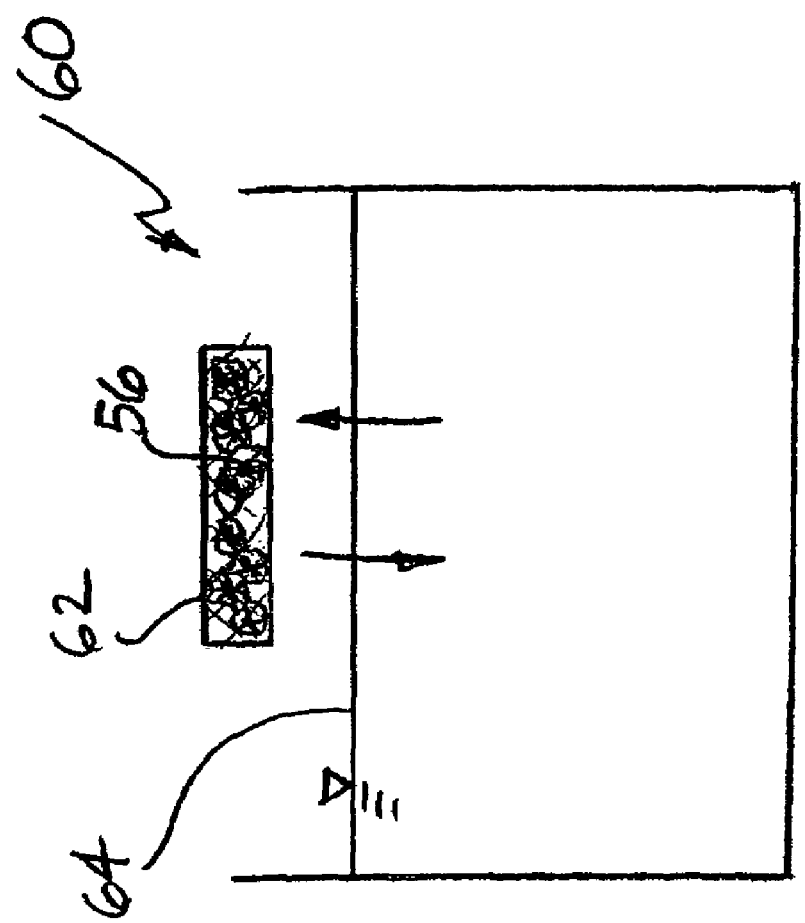
FIG. 5 schematically illustrates the second stage of a method of forming a leak detection dye carrier according to a second embodiment of the invention.

Referring to FIG. 5, there is illustrated schematically an alternate method 60 of forming the dye carrier wafer 62. Like the above-described hybrid dry/wet method 53, the method 60 is a two-stage process. The first stage of method 60, like that of method 53, uses a dry system in which dispersed dye solids 56 are formed by saturating the wafer 62 with a mixture of dye powder and an evaporable solvent, and allowing the solvent to evaporate.

In the second stage of method 60, the wafer 62 with dispersed dye solids 56 has a liquid applied to the solid laden dye wafer to enhance the dye wafer. The application of the liquid in the wet stage can be applied by dipping the wafer into a wet bath containing the desired liquid 64. The amount of time that the wafer 62 remains immersed in the liquid 64 during the second stage of method 60, however, is limited such that the dispersed dye solids 56 are not dissolved by the liquid 64 but, instead, are merely coated and softened by the liquid 64.

The liquid 64 of the wet bath used to coat the dye solids 56 in the second phase of method 60 could vary. According to one embodiment, the liquid 64 of the wet bath of method 60 could include a mixture of dye powder and an evaporable solvent, like that used during the first stage. The volume of liquid 64 absorbed by the wafer 62 during the second stage of method 60 will typically be less than the volume absorbed during the first stage of method 60. However, the second stage enhances the dye concentration in the wafer.

Alternatively, the liquid 64 of the wet bath of method 60 could include an additive, such as a solvent without a dye, for example, a system lubricant. As described above, the time that the wafer 62 remains immersed in the additive is preferably limited to prevent the dispersed dye solids 56 formed in the first stage from being dissolved during the second stage. The additive coating on the dispersed dye solids 56 softens the dye solids, thereby placing them in an "activated" condition such that subsequent introduction of the dye into the refrigeration system following charging of the system will occur more rapidly.

Two fluorescent leak detection dyes which are suitable in the present invention for forming the dye concentrate are perylene-based fluorescent compounds and naphthalimide-based fluorescent compounds. Perylene dyes produce a yellow fluorescent response when exposed to incident radiation which includes the UV-A wavelength band of about 315 nm to about 400 nm, with a strong peak between about 340 to 375 nm. Naphthalimide dyes fluoresce green when exposed to incident radiation of visible violet/blue light in a range from about 400 nm to about 480 nm.

For example, the dyes used in the present invention could include naphthoxanthene, perylene and naphthalene compounds, such as:
  Naphtho{3,2,1-kl}xanthene-2,8-dialkyl
  3,9-perylenedialkylacetate
  4-alkylamino-n-alkyl-naphthalimide
  Dinaphtho(1,2,3-cd; 1'2'3-1m)perylene-9,18-dione,alkyl derivatives.

The dye must be stable at operating temperatures of the A/C or refrigeration system, and should not change the properties of the refrigerant or the system lubricant or adversely effect components and parts of the system. Any of the dyes described in U.S. Pat. Nos. 4,938,063; 5,167,140; 6,165,384 and RE 36951, which are each incorporated herein by reference in their entirety.

As discussed above, the wafer, pill, tablet or other dye medium is then placed within the container 102, either prior to, during, or after introduction of refrigerant 106 into the container 102. In one embodiment, the container 102 includes a valve 110 for maintaining the refrigerant 106 and the dye medium 108 within the container 102 until such time as the refrigerant and dye mixture is introduced into the air conditioning or refrigeration system. The container 102 is preferably pressurized after the dye medium is placed within the container 102 so as to provide a pressurized source of dye and refrigerant.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A container of refrigerant and leak detection dye medium for supplying to an air conditioning or refrigeration system comprising:
  a storage container for storing an amount of material for subsequent supply to an air conditioning or refrigeration system, the container adapted to communicate with a hose or other connection to the air conditioning or refrigeration system for supplying the material to the air conditioning or refrigeration system;
  a refrigerant inside the storage container; and
  a leak detection dye medium located within the storage container, the dye medium including a dye solid adapted to fluoresce when exposed to incident radiation below about 500 nm, the dye solid having an initial state in the storage container where the dye medium is in the form of a pill, tablet, powder or an impregnated carrier substrate separate from the refrigerant, and a second state where the dye solid is dispersed or mixed with the refrigerant, after the storage container is filled with refrigerant;
  the dye solid being present in an amount such that when the dye solid is in the second dispersed or mixed state, in the refrigerant in the storage container, the refrigerant in the storage container contains the dye solid at a concentration that is suitable for leak detection in an air conditioning or refrigeration system without adversely affecting the operation of the air conditioning or refrigeration system.

2. A container according to claim 1, wherein the dye medium is in the form of a carrier substrate and wherein the dye solid in the initial state is impregnated on the carrier substrate.

3. A container according to claim 2, wherein the carrier substrate is a wafer made from a polyester felt.

4. A container according to claim 1, wherein the container also includes a lubricating oil intermixed with the refrigerant, and wherein the dye solid is configured to dissolve from the initial state to the second state where it intermixes with the refrigerant.

5. A container according to claim 4, wherein the dye solid is configured to begin to dissolve when it is exposed to the refrigerant.

6. A container according to claim 4, wherein the dye solid is configured to begin to dissolve when it is exposed to the lubricant.

7. A container according to claim 1, wherein the dye solid comprises a fluorescent, alkyl substituted perylene dye.

8. A container according to claim 1, wherein the dye solid comprises a fluorescent, alkyl substituted naphthalimide dye.

9. A container according to claim 1, wherein the dye medium comprises the dye solid shaped in the form of a tablet, pill or granular powder in the initial state.

10. A container according to claim 1, wherein the dye medium comprises the dye solid in the form of a solid or gel in the initial state.

11. A container according to claim 1, wherein the dilution ratio of refrigerant to dye solid is 375:1.

12. A container according to claim 1, wherein the dye medium is in the form of an impregnated carrier substrate, the carrier substrate being impregnated with about 0.021 to about 0.04 ounces of a carrier liquid or solvent containing a dye solid.

13. A container according to claim 1, wherein the dye medium contains about 0.12 to about 0.24 grams of dye solid.

14. A container according to claim 1, wherein the dye medium contains about 0.06 to about 0.47 grams of dye solid.

15. A method of manufacturing a refrigerant and dye mixture for supplying to an air conditioning or refrigeration system, the method comprising the steps of:
  a. providing a storage container for storing an amount of refrigerant and dye mixture for subsequent supply to an air conditioning or refrigeration system, the container adapted to communicate with the air conditioning or refrigeration system for supplying the mixture to the air conditioning or refrigeration system, the container adapted to store the mixture until it is added to an air conditioning or refrigeration system;
  b. adding a leak detection dye medium into the storage container, the dye medium including a dye solid adapted to fluoresce when exposed to incident radiation below about 500 nm, the dye solid having an initial state in the storage container where the dye medium is in the form of a pill, tablet, powder or impregnated carrier substrate;
  c. adding a desired amount of refrigerant into the storage container; and
  d. allowing the dye solid to mix with the refrigerant so as to form a mixture, wherein the refrigerant in the storage container contains the dye solid at a concentration that is suitable for leak detection in the air conditioning or refrigeration system without adversely affecting the operation of the air conditioning or refrigeration system.

16. A method of manufacturing a refrigerant and dye mixture according to claim 15, wherein the leak detection dye medium includes an impregnated carrier substrate and wherein the method includes the steps of placing the dye solid onto the carrier substrate.

17. A method of manufacturing a refrigerant and dye mixture according to claim 15, further comprising the step of selling the container containing the mixture to a customer for eventual use by an end-user in adding the mixture to an air conditioning or refrigerant system.

18. A method of manufacturing a refrigerant and dye mixture according to claim 15, further comprising the step of connecting the container to the air conditioning or refrigeration system, and adding the mixture to the air conditioning or refrigeration system.

19. A method according to claim 15, wherein the dilution ratio of refrigerant to dye solid is 375:1.

20. A method according to claim 15, wherein the dye medium is in the form of an impregnated carrier substrate, the carrier substrate being impregnated with about 0.021 to about 0.04 ounces of a carrier liquid or solvent containing a dye solid.

21. A method according to claim 15, wherein the dye medium contains about 0.12 to about 0.24 grams of dye solid.

22. A method according to claim 15, wherein the dye medium contains about 0.06 to about 0.47 grams of dye solid.

* * * * *